3,748,340
BIS-IMIDES OF POLYHALO SUBSTITUTED POLY-
HYDROPOLYCYCLICDICARBOXYLIC ACIDS
Charles M. Hayes, Hoffman Estates, Ill., assignor to
Universal Oil Products Company, Des Plaines, Ill.
No Drawing. Filed Sept. 5, 1968, Ser. No. 757,801
Int. Cl. C07d 27/52
U.S. Cl. 260—326 C  3 Claims

ABSTRACT OF THE DISCLOSURE

A novel composition of matter of the formula:

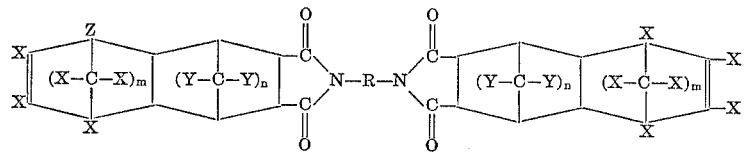

in which X and Y are selected from the group consisting of hydrogen and halogen radicals, at least two X's being halogen; R is selected from the group consisting of $C_2$-$C_4$ alkylene, phenylene, cyclohexylene, $$-(CH_2)_2NH(CH_2)_2NH(CH_2)_2-$$

and

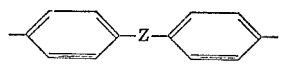

wherein Z is oxygen, sulfur or amino; m is 1 or 2; and n is 1 or 2. The novel compositions of matter are useful as additives for plastics, polymers, etc. whereby flameproof or fire-retardant properties are added thereto.

---

This invention relates to novel compositions of matter comprising the bis-imides of polyhalo substituted polyhydropolycyclicdicarboxylic acids. More specifically, the invention relates to these compositions of matter and to the use thereof as additives to polymers or other chemical compounds whereby certain desirable physical characteristics are imparted to these compounds.

It has now been discovered that novel compositions of matter comprising, as hereinbefore set forth, bis-imides of polyhalo substituted polyhydropolycyclicdicarboxylic acids may be prepared by reacting a diamino compound of the type hereinafter set forth in greater detail with a polyhalo substituted polyhydropolycyclicdicarboxylic acid or anhydride thereof within a certain mole ratio to prepare the desired products. These novel compositions of matter will, as hereinbefore set forth, be useful as additives to plastics, polymers, co-polymers, terpolymers, resins, elastomers, rubbers, textiles and fibers, both naturally occurring and synthetic in nature, such as cotton, wool, Dacron, nylon, rayon, etc., coatings, paints varnishes, leather, foams, cellulose acetate butyrate, ethyl cellulose, cellulose propionate, etc., polyolefins such as polyethylene and polyethylene co-polymers, polypropylene and polypropylene co-polymers, polystyrenes, polystyrene co-polymers, polyvinyl acetate, or alcohol and co-polymers, polyesters, polyurethane, polyphenyl ethers, polycarbonates, polyamides, polyoxymethylenes, polyalkylene oxides such as polyethylene oxide, polyacrylates and co-polymers, polymethacrylates and co-polymers with styrene, butadiene, acrylonitrile, etc., epoxy resins, acrylonitrile-butadiene-styrene formulations (commonly known as ABS), polybutylene and acrylic ester modified styrene-acrylonitrile (ASA), methyl-methacrylate-styrene-butadiene terpolymers, etc. whereby the desirable physical characteristics of flameproofing or fire retardancy will be imparted to the aforementioned materials. This property will possess special advantages when preparing plastic or resinous material which will be utilized in places which may be subjected to excessive heat or possible flame such as architectural panels for construction work, wall plugs for electrical connections, ash trays, etc. In addition, the compound when used as a constituent of paint, lacquer, varnishes, or protective coatings, films, etc. will also impart a fire resistency to these compounds, and, therefore, render them commercially attractive as articles of commerce. Furthermore, the flame retardancy of foam such as the polyurethane foams will greatly enhance their use as insulating material or soundproofing material. Also, besides imparting the desirable physical characteristics of flame retardancy to the various articles of manufacture, the additives will permit formulation of lighter or less colored plastics or resins and, therefore, will be an important component of these compounds whenever it is desirable that discoloration of the finished product is to be avoided or will tend to render such articles unuseable. It is also contemplated that the novel compositions of matter of this invention may also be used as an insecticide or as an ingredient in insecticidal formulations.

It is therefore an object of this invention to provide novel compositions of matter which possess desirable physical properties.

Another object of this invention is to provide novel compositions of matter possessing the desirable physical characteristics of flameproofing and fire retardancy which may be used as additives in other chemical formulations.

In one aspect an embodiment of this invention resides in a composition of matter possessing the formula:

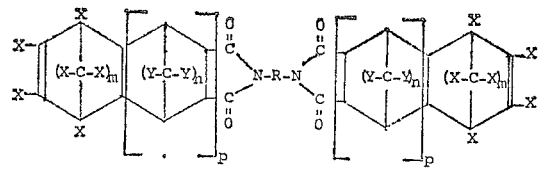

in which X and Y are selected from the group consisting of hydrogen and halogen radicals, at least two X's being halogen; R is selected from the group consisting of alkyl, aryl, cycloalkyl, aminoalkyl of 2 to about 20 carbon atoms, polyalkyleneamino, polyalkylenepolyamino, diaryl ether, diaryl sulfide, diarylamine, and diarylalkylene radicals; m is an integer of from 1 to 2; n ranges from 0 to 2; p ranges from 0 to 1.

A specific embodiment of this invention is found in 1,2 - bis(5,6,7,8,9,9-hexachloro - 1,2,3,4,4a,5,8,8a-octahydro-5,8-methano-2,3-naphthalenedicarboximido)ethane.

Another specific embodiment of this invention is found in a composition of matter comprising polyphenylene oxides and 1,2-bis(5,6,7,8,9,9-hexachloro-1,2,3,4,4a,5,8, 8a - octahydro - 5,8-methano-2,3-naphthalenedicarboximido)ethane.

Other objects and embodiments will be found in the following further detailed description of the present invention.

As hereinbefore set forth, the present invention is concerned with novel compositions of matter comprising the bis-imides of polyhalo substituted polyhydropolycyclicdicarboxylic acids. In one embodiment, these compounds are prepared by condensing a polyhalo substituted polyhydropolycyclicdicarboxylic acid or anhydride with a diamino compound of a type hereinafter set forth in greater detail, said condensation being set forth in a later portion of the present specification. Any suitable polyhalo substituted polyhydropolycyclicdicarboxylic acid or anhydried thereof may be used in the preparation of the desired composition of matter, said polyhalo substituted polyhydropolycyclicdicarboxylic acid or anhydride thereof being illustrated by the following general formulas:

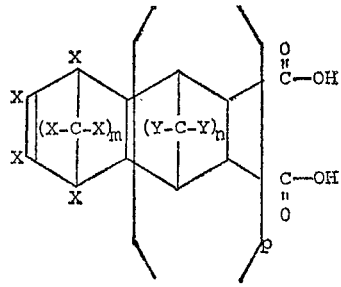

or

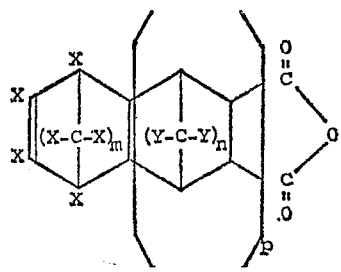

in which X is selected from the group consisting of halogen and particularly chlorine and/or bromine, and hydrogen radicals, at least two of the X's being halogen, Y is also selected from the group consisting of halogen and hydrogen radicals, $m$ is an integer of from one to two, $n$ ranges from zero to two and $p$ ranges from zero to one. Representative examples of the polyhalopolyhydropolycyclicdicarboxylic acids or anhydrides thereof which may be utilized include 1,4,5,6,7,7-hexachlorobicyclo-[2.2.1]-5-heptene-2,3-dicarboxylic acid or the anhydride thereof which may be prepared by condensing maleic acid or maleic anhydride with hexachlorocyclopentadiene. Another example of the acid or anhydride which may be used comprises 5,6,7,8,9,9-hexachloro-1,2,3,4,4a,5,8,8a- octahydro-5,8-methano-2,3-naphthalenedicarboxylic acid which is prepared by condensing a conjugated aliphatic diene such as 1,3-butadiene with maleic acid and thereafter further condensing the resultant cyclohexenedicarboxylic acid, which is 1,2,3,6-tetrahydrophthalic acid, with a halocycloalkadiene such as hexachlorocyclopentadiene to form the desired product. It is to be understood that the corresponding anhydride may be prepared by utilizing maleic anhydride as one of the starting materials in place of maleic acid. Yet another example of a polyhalopolyhydropolycyclicdicarboxylic acid or anhydride which may be used is one which is prepared by condensing cyclopentadiene with maleic acid or maleic anhydride to form norborn-5-ene-2,3-dicarboxylic acid or anhydride and thereafter condensing this product with hexachlorocyclopentadiene to form 5,6,7,8,9,9 - hexachloro - 1,2,3,4,4a,5,8,8a-octahydro-1,4,5,8-dimethano-2,3-naphthalenedicarboxylic acid or anhydride. It is to be understood that other starting materials may also be utilized to form similar acids or anhydrides. Illustrative examples of these starting materials include other acids such as fumaric acid, itaconic acid, citraconic acid, glutaconic acid, etc.; conjugated aliphatic dienes include 2 - methyl-1,3-butadiene, 1,3-pentadiene, 1,3-hexadiene, 2,4-hexadiene, 2,3-dimethyl-1,3-butadiene, 1,3-heptadiene, 2,4-heptadiene; conjugated octadienes, nonadienes, etc.; other suitable halo substituted cycloalkadienes which may be used include 1,2-dichlorocyclopentadiene, 1,2,3-trichlorocyclopentadiene, 1,2,3,4 - tetrachlorocyclopentadiene, 1,2,3,4,5-pentachlorocyclopentadiene and similar compounds in which all or part of the chlorine is replaced by other halogen atoms and particularly bromine.

As hereinbefore set forth the aforementioned polyhalo substituted polyhydropolycyclicdicarboxylic acids or anhydrides thereof are condensed with a diamino compound possessing the generic formula:

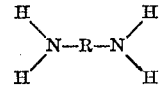

in which R is selected from the group consisting of alkyl, aryl, cycloalkyl, aminoalkyl, polyalkyleneamino, polyalkylenepolyamino, of from 1 to about 20 carbon atoms, polyalkylene, polyamino, or radicals having the generic formula:

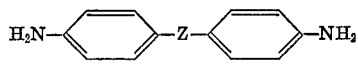

in which Z is selected from the group consisting of oxygen, sulfur, sulfone, amine, or alkyl radicals which may be straight chained or branch chained in nature. Some representative illustrated examples of these diamino compounds will include alkylene polyamines such as ethylenediamine, propylenediamine (1,3-diaminopropane), 1,4-butylenediamine, 1,5 - pentylenediamine, 1,6 - hexylenediamine, etc.

Other amine compounds which may be used include polyalkylenepolyamines including diethylenetriamine, dipropylenetriamine, dibutylenetriamine, dipentylenetriamine, dihexylenetriamine, diheptylenetriamine, dioctylenetriamine, etc., triethylenetetramine, tripropylenetetramine, tributylenetetramine, triphenylenetetramine, trihexylenetetramine, triheptylenetetramine, trioctylenetetramine, etc., tetraethylenepentamine, tetrapropylene pentamine, tetrapentylenepentamine, tetrahexylenepentamine, tetraheptylenepentamine, etc., pentaethylenehexamine, pentapropylenehexamine, pentabutylenehexamine, pentapentylenehexamine, etc.

Aromatic diamines or polyamines which may be used include o-phenylenediamine, m-phenylenediamine, p-phenylenediamine, 1,2 - naphthalenediamine, 1,4-naphthalenediamine, 1,5-naphthalenediamine, 1,6-naphthalenediamine, 1,7-naphthalenediamine, 1,8-naphthalenediamine, 2,3-naphthalenediamine, 2,6-naphthalenediamine, 2,7-naphthalenediamine, 1,2,3-triaminobenzene, 1,2,4-triaminobenzene, 1,3,5-triaminobenzene, etc.; cycloalkylamines such as the isomeric cyclobutyldiamines, cyclopentyldiamines, cyclohexyldiamines, cylcoheptyldiamines, cyclooctyldiamines, etc., p,p'-diaminodiphenyl ether, p,p'-diaminodiphenyl sulfide, p,p'-diaminodiphenyl sulfone, p,p'-diaminodiphenyl amine, p,p'-diaminodiphenyl methane, 1,2-di(p-aminophenyl)ethane, 1,3-di(p-aminophenyl)propane, 2,2-di(p - aminophenyl)propane 2,3-di(p-aminophenyl)propane, 1,4 - di(p-aminophenyl)butane, etc. It is also contemplated within the scope of this invention that polyarylenepolyamines, diaminodinaphthalene, diaminonaphthalene, etc., and polycycloalkylenepolyamines such as diaminodicyclobutylamines, diaminodicyclopentylamines, diaminodicyclohexylamines, the tricycloalkyltetraamines, the tetratrialkylpentaamines, may also be used, although not necessarily with equivalent results. It is to be understood that the aforementioned amine compounds are only representative of the class of compounds falling with the generic formula hereinbefore set forth, and that the present invention is not necessarily limited thereto.

As hereinbefore set forth, the novel compositions of matter of the present invention are prepared by condensing a polyhalo substituted polyhydropolycyclicdicarboxylic acid or anhydride thereof of the type hereinbeofre set forth in greater detail with a diamino compound at condensation conditions which include a temperature in the range of from ambient (about 25° C.) up to about 250° C. or more and pressures which may range from atmospheric up to about 50 atmospheres or more. The preferred condensation conditions are those within the lower range hereinbefore set forth, that is, ambient temperature and atmospheric pressure. However, if elevated temperatures in the upper limit of the range hereinbefore set forth are employed, it is contemplated that the reaction will be effected at superatmospheric pressures. These superatmospheric pressures are generated by the introduction of a substantially inert gas such as nitrogen into the reaction zone, said pressure which is used being that which is sufficient to maintain a major portion of the reactants in the liquid phase. Generally speaking, the condensation may also be effected in the presence of a substantailly inert organic solvent. When utilizing such a solvent, the temperautre which is then employed will usually be the reflux temeprature of the solvent. Specific examples of the type of solvents which may be employed will include aromatic hydrocarbons such as benzene, toluene, o-xylene, m-xylene, p-xylene, ethylbenzene, etc.; aliphatic, cycloaliphatic paraffins such as n-pentane, n-hexane, n-heptane, cyclopentane, methylcyclopentane, cyclohexane, etc.; ethers such as dimethyl ether, diethyl ether, di-n-propyl ether, di-isopropyl ether, dioxane, etc.; various esters, chlorinated hydrocarobns, etc. The residence time during which the condensation is effected will be of a duration which is sufficient to effect a substantially complete reaction and may vary from about 0.5 up to about 10 hours or more, the reaction being substantially complete when the theoretical amount of water which has been formed during condensation has been removed. The polyhalo substituted polyhydroplycyclicdicarboxylic acid or anhydride thereof is present in a molar excess over the amount of amine compound, said molar excess ranging from at least 2:1 up to about 10:1 moles of acid or anhydride per mole of diamino compound.

The process of the present invention may be effected in any suitable manner and may comprise either a batch or continuous type operation. For example, when a batch type operation is used a quantity of the particular acid or anhydride and diamino compound in a mole ratio of at least two moles of acid or anhydride per mole of diamino compound is placed in an appropriate apparatus along with a particular solvent if one is desired. The apparatus, which may comprise a condensation flask, is provided with heating and stirring means as well as a water trap whereby the water of reaction which is formed may be withdrawn. The flask is then heated to the desired operating temperature, which if a solvent is used, is the reflux temperature thereof, and allowed to proceed for a predetermined resident time. This time is calculated as when the theoretical amount of water has been removed. Following this the flask and contents thereof are allowed to cool to room temperature and the reaction product is recovered. The product is then separated from any solvent by conventional means such as evaporation, suction, filtration, etc., and recovered. In the event that superatmospheric temperatures and pressures are to be used, the reactor which is employed for the batch type operation may comprise a rotating or stirred autoclave whereby the desired pressure may be attained by charging nitrogen to the reactor prior to heating to the desired operating temperature.

It is also contemplated within the scope of this invention that the continuous manner of operation may be employed. When such a type of operation is used the starting material comprising the acid or anhydride of the type hereinbefore set forth in greater detail and the diamino compound are continuously charged to the reactor which is maintained in the proper operating conditions of temperature and pressure. In the event that a solvent is to be employed, one or both of the reactants may be dissolved in the solvent prior to entry into said reactor. Alternatively speaking, the solvent may be charged to the reactor in a separate stream if so desired. Upon completion of the desired residence time the reaction effluent is continuously withdrawn. The reaction product is separated from the water of reaction which is formed and the solvent by conventional means. In addition, the reaction product is also separated from any unreacted starting material which may still be present in the reactor, the latter being recycled to form a portion of the feedstock. The desired N,N'-bis-imides of the polyhalo substituted polyhydropolycyclicdicarboxylic acids are recovered.

While the aforementioned method of preparing the novel compositions of matter of the present invention have shown the condensation of a polyhalo substituted polyhydropolycyclicdicarboxylic acid or anhydride thereof with a diamino compound, it is also contemplated within the scope of this invention that other processes of preparing the desired products may also be utilized. For example, the diamino compound may also be reacted with an unsaturated dibasic acid or anhydride, thereafter adding a diolefinic hydrocarbon to the resulting bis-imide followed by the further addition with another halogenated diene. For example, maleic acid or anhydride may be condensed with 1,2-ethylenediamine. The resultant compound may then be condensed with 1,3-butadiene followed by the further addition of hexachloropentadiene to form the desired 1,2-bis(5,6,7,8,9,9 - hexachloro - 1,2,3,4,4a,5,8,8a-octahydro-5,8-methano - 2,3 - naphthalenedicarboximido) ethane.

Examples of the novel compositions of matter of the present invention comprise bis-imides of polyhalo substituted polyhydropolycyclicdicarboxylic acids or anhydrides thereof and will possess the generic formula:

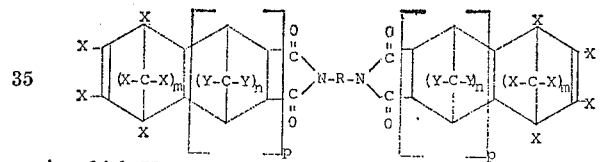

in which X and Y are selected from the group consisting of hydrogen and halogen radicals at least two X's being halogen; R is selected from the group consisting of alkyl, aryl, cycloalkyl, aminoalkyl of 2 to about 20 carbon atoms, polyalkyleneamino, polyalkylenepolyamino, diaryl ether, diaryl sulfide, diaryl sulfone, diarylamine, and diarylalkylene radicals; $m$ is an integer of from 1 to 2; $n$ ranges from 0 to 2; and $p$ ranges from 0 to 1. Some representative illustrative examples will include 1,2-bis(5,6,7,8,9,9-hexachloro-1,2,3,4,4a,5,8,8a-octahydro-5,8-methano-2,3-naphthalenedicarboximido)ethane;
1,3-bis(5,6,7,8,9,9-hexachloro-1,2,3,4,4a,5,8,8a-octahydro-5,8-methano-2,3-naphthalenedicarboximido)propane;
2,2-bis(5,6,7,8,9,9-hexachloro-1,2,3,4,4a,5,8,8a-octahydro-5,8-methano-2,3-naphthalenedicarboximido)propane;
1,4-bis(5,6,7,8,9,9-hexachloro-1,2,3,4,4a,5,8,8a-octahydro-5,8-methano-2,3-naphthalenedicarboximido)butane;
1,2-bis(5,6,7,8,9,9-hexachloro-1,2,3,4,4a,5,8,8a-octahydro-1,4,5,8-dimethano-2,3-naphthalenedicarboximido)ethane;
1,3-bis(5,6,7,8,9,9-hexachloro-1,2,3,4,4a,5,8,8a-octahydro-1,4,5,8-dimethano-2,3-naphthalenedicarboximido)propane:
2,2-bis(5,6,7,8,9,9-hexachloro-1,2,3,4,4a,5,8,8a-octahydro-1,4,5,8-dimethano-2,3-naphthalenedicarboximido)propane;
1,4-bis(5,6,7,8,9,9-hexachloro-1,2,3,4,4a,5,8,8a-octahydro-1,4,5,8-dimethano-2,3-naphthalenedicarboximido)butane;
1,2-bis(1,4,5,6,7,7-hexachlorobicyclo-[2.2.1]-5-heptene-2,3-dicarboximido)ethane;
1,3-bis(1,4,5,6,7,7-hexachlorobicyclo-[2.2.1]-5-heptene-2,3-dicarboximido)propane;
2,2-bis(1,4,5,6,7,7-hexachlorobicyclo-[2.2.1]-5-heptene-2,3-dicarboximido)propane;
1,4-bis(1,4,5,7,7-hexachlorobicyclo-[2.2.1]-5-hexene-2,3-dicarboximido)butane;

1,4-bis(5,6,7,8,9,9-hexachloro-1,2,3,4,4a,5,8,8a-octahydro-5,8-methano-2,3-naphthalenedicarboximido)benzene;
1,4-bis(5,6,7,8,9,9-hexachloro-1,2,3,4,4a,5,8,8-octahydro-5,8-methano-2,3-naphthalenedicarboximido)cyclohexane;
p,p'-bis(5,6,7,8,9,9-hexachloro-1,2,3,4,4a,5,8,8a-octahydro-5,8-methano-2,3-naphthalenedicarboximido) diphenyl ether;
p,p'-bis(5,6,7,8,9,9-hexachloro-1,2,3,4,4a,5,8,8a-octahydro-5,8-methano-2,3-naphthalenedicarboximido) diphenyl sulfide;
p,p'-bis(5,6,7,8,9,9-hexachloro-1,2,3,4,4a,5,8,8a-octahydro-5,8-methano-2,3-naphthalenedicarboximido) diphenylamine;
1,4-bis(5,6,7,8,9,9-hexachloro-1,2,3,4,4a,5,8,8a-octahydro-1,4,5,8-dimethano-2,3-naphthalenedicarboximido)benzene;
1,4-bis(5,6,7,8,9,9-hexachloro-1,2,3,4,4a,5,8,8a-octahydro-1,4,5,8-dimethano-2,3-naphthalenedicarboximido)-cyclohexane;
p,p'-bis(5,6,7,8,9,9-hexachloro-1,2,3,4,4a,5,8,8a-octahydro-1,4,5,8-dimethano-2,3-naphthalenedicarboximido)-diphenyl ether;
p,p'-bis(5,6,7,8,9,9-hexachloro-1,2,3,4,4a,5,8,8a-octahydro-1,4,5,8-dimethano-2,3-naphthalenedicarboximido)diphenyl sulfide;
p,p'-bis(5,6,7,8,9,9-hexachloro-1,2,3,4,4a,5,8,8a-octahydro-1,4,5,8-dimethano-2,3-naphthalenedicarboximido)diphenylamine;
1,4-bis(1,4,5,6,7,7-hexachlorobicyclo-[2.2.1]-5-heptene-2,3-dicarboximido)benzene;
1,4-bis(1,4,5,6,7,7-hexachlorobicyclo-[2.2.1]-5-heptene-2,3-dicarboximido)cyclohexane;
p,p'-bis(1,4,5,6,7,7-hexachlorobicyclo-[2.2.1]-5-heptene-2,3-dicarboximido)diphenyl ether;
p,p'-bis(5,6,7,8,9,9-hexachlorobicyclo-[2.2.1]-5-heptene-2,3-dicarboximido)diphenyl sulfide;
p,p'-bis(1,4,5,6,7,7-hexachlorobicyclo-[2.2.1]-5-heptene-2,3-dicarboximido)diphenylamine;
bis(5,6,7,8,9,9-hexachloro-1,2,3,4,4a,5,8,8a-octahydro-5,8-methano-2,3-naphthalenedicarboximido)ethylene;
bis(5,6,7,8,9,9-hexachloro-1,2,3,4,4a,5,8,8a-octahydro-1,4,5,8-dimethano-2,3-naphthalenedicarboximido) ethylene;
bis(1,4,5,6,7,7-hexachlorobicyclo-[2.2.1]-5-heptene-2,3-dicarboximido)ethylene;
bis(5,6,7,8,9,9-hexachloro-1,2,3,4,4a,5,8,8a-octahydro-5,8-methano-2,3-naphthalenedicarboximido)triethylene diamine;
N,N'-bis(5,6,7,8,9,9-hexachloro-1,2,3,4,4a,5,8,8a-octahydro-1,4,5,8-dimethano-2,3-naphthalenedicarboximido)triethylene diamine;
N,N'-bis(1,4,5,6,7,7-hexachlorobicyclo-[2.2.1]-5-heptene-2,3-dicarboximido)triethylene diamine;

the corresponding bromo substituted bis-imides, etc. While the above illustrative examples are all drawn to hexahalo substituted compounds, it is to be understood that imides containing less than 6 halogen atoms such as pentachloro-substituted, pentabromo-substituted, tetrachloro-substituted, tetrabromo-substituted, trichloro-substituted, tribromo-substituted, dichloro-substituted, dibromo-substituted, etc. compounds also fall within the scope of this invention and are correspondingly prepared by utilizing dihalo-substituted, trihalo-substituted, tetrahalo-substituted, pentahalo-substituted, etc. dienic hydrocarbons as starting materials.

As hereinbefore set forth the novel compositions of matter of the present invention may be utilized as additives for plastics, resins, polymers, co-polymers, etc. For example, the bis-imides of the polyhalo substituted polyhydropolycyclicdicarboxylic acids or anhydrides thereof may be used as additives with epoxy resins whereby the final product will possess advantageous physical properties such as a high degree of flame retardancy, a stability toward color decomposition, etc. The epoxy resins in an uncured state are usually thermol-plastic and may range from low viscosity liquids to high melting point brittle solids. One example of epoxy resin which may be used with the bis-imides of the present invention is the condensation product of epichlorohydrin and bisphenol-A. The resins may be prepared by admixing a bis-imide of an acid of the type hereinbefore set forth with the resin and a standard curing agent such as a polyamine, and thereafter curing the mixture by treatment at an elevated temperature for a predetermined period of time. The resultant product will have the physical characteristics thereof altered to their desirable values and thus may be utilized for various purposes such as floor surfacings, coatings, etc. Another type of polymeric compounds comprise polyphenyl ethers which have been extended by treatment with styrene. The addition of the bis-imides of the polyhalo substituted polyhydropolycyclicdicarboxylic acids will again alter the physical characteristics of the polymer by adding desirable flame retardancy and color stability properties to the finished products. Likewise, other polymers such as polyesters, polyolefins, polycarbonates, polyurethane foams, etc. will also possess enhanced fire retardant and color stability properties by the addition of these bis-imides in an amount ranging from about 5% to about 50% by weight of the polymeric material to be treated.

The following examples are given to illustrate the process of the present invention which, however, are not intended to limit the generally broad scope of the present invention in strict accordance therewith.

EXAMPLE I

To a three-liter, three-necked flask which was provided with a Dean-Stark water trap, stirrer, and heating mantle were charged 1500 cc. of toluene and 425 grams (1.0 mole) of 5,6,7,8,9,9-hexachloro-1,2,3,4,4a,5,8,8a-octahydro-5,8-methano-2,3-naphthalenedicarboxylic anhydride. To this mixture, 30 grams (0.5 mole) of ethylenediamine were added, which was diluted with 200 cc. of toluene, dropwise over a period of about 10 minutes, the temperature rising to 39° C. Heat was applied to the reaction vessel and the mixture was allowed to reflux. During the first hour of the reaction, 14 cc. of water was produced. After an additional period of 3 hours, a total of 16 cc. of water was recovered. The mixture was allowed to reflux for an additional period of 4 hours or a total of 8 hours overall, no additional water being obtained during the last half of the reaction time. The reaction mixture was filtered while hot and 276 grams of white, powdery crystals were obtained. It was found that the crystals were only soluble in dimethyl formamide and dimethyl sulfoxide. The crystals were therefore dissolved in dimethyl formamide and recrystallized by adding water.

Analysis of the crystals gave the following results: Theoretical: Cl, 48.7%. Found: Cl, 47.1%. In addition, the white, powdery crystals had a melting point of about 330° C. These crystals comprise 1,2-bis(5,6,7,8,9,9-hexachloro-1,2,3,4,4a,5,8,8a - octahydro - 5,8 - methano-2,3-naphthalenedicarboximido)ethane.

EXAMPLE II

In this example 425 grams (1.0 mole) of 5,6,7,8,9,9-hexachloro - 1,2,3,4,4a,5,8,8a-octahydro-5,8-methano-2,3-naphthalenedicarboxylic anhydride and 1400 grams of toluene were placed in a three-liter flask provided with heating and stirring means as well as a Dean-Stark water trap. Following this, 55 grams (0.5 mole) of p-phenylenediamine was slowly added to the solution. The temperature rose due to the exothermicity of the reaction. The resulting slurry was refluxed for approximately 2 hours at 112° C. During this reaction time, a total of 14 cc. of water was produced and collected in the Dean-Stark trap. At the end of the 2 hours, the temperature was raised and about 500 cc. of the toluene was distilled off. Xylene was then added until a reflux temperature of 133° C. was reached. The slurry was then refluxed at 133° C. for an additional period of 8 hours. At the end of this time, 1075 cc. of dimethyl formamide was added to the slurry in the reactor and upon warming, the slurry was dissolved. The reaction mixture was filtered and allowed to stand for an additional period of 16 hours, no crystals forming during the standing period. At the end of the standing period, 600 cc. of isopropyl alcohol was added to effect a precipitation and the mixture was again allowed to stand for a period of 24 hours. At the end of this 24 hour period, the precipitate was filtered and 238 grams of a white crystal material was recovered.

The filtrate was distilled to remove all solvents, the residue was warmed with acetone and filtered. The precipitate was washed with fresh acetone and dried under vacuum. The resulting crystals had a melting point of over 370° C. followed by decomposition. The crystals, upon being subjected to analysis gave the following results: Theoretical: N, 2.74%; Cl, 41.6%. Found: N, 2.98%; Cl, 46.1%. These crystals were 1,4-bis(5,6,7,8,9,9-hexachloro-1,2,3,4,4a,5,8,8a - octahydro - 5,8 - methano-2,3-naphthalenedicarboximido)benzene.

EXAMPLE III

In this example 437 grams (1.0 mole) of 5,6,7,8,9,9-hexachloro-1,2,3,4,4a,5,8,8a-octahydro - 1,4,5,8 - dimethano-2,3-naphthalenedicarboxylic anhydride and 1400 cc. of toluene are placed in a condensation flask. To this mixture is added 30 grams (0.5 mole) of ethylenediamine, which are dissolved in 200 cc. of toluene, are slowly added dropwise over a period of about 0.5 hour. The temperature of the reaction will rise to approximately 40° C. during the addition. At the end of the addition period, heat is applied and the solution is refluxed at a temperature of about 112° C. for a period of about 4 hours. During this time the water which is formed by the condensation is produced and collected in a Dean-Stark water trap which is attached to the condensation flask. The reaction is refluxed for an additional period of 4 hours during which time no additional water of condensation is formed. At the end of the total 8 hour period, the reaction mixture is filtered while hot and white, powdery crystals are obtained. The crystals are separated by filtration, dissolved in dimethyl formamide and recrystallized by adding water. The recrystallized compound comprising 1,2-bis-(5,6,7,8,9,9 - hexachloro - 1,2,3,4,4a,5,8,8a - octahydro-1,4,5,8 - dimethano - 2,3 - naphthalenedicarboximido) ethane is recovered.

EXAMPLE IV

A mixture of 389 grams( 1.0 mole- of 1,4,5,6,7,7-hexachlorobicyclo-[2.2.1]-5-heptene - 2,3 - dicarboxylic acid which is combined with 1200 cc. of toluene is placed in a condensation flask similar to that set forth in the above examples. Following this, 95 grams (0.5 mole) of p,p'-diamino diphenyl ether which is dissolved in 200 cc. of toluene is slowly added dropwise to the flask during a period of about 0.5 hour. The temperature of the flask, which was at ambient temperature at the beginning of the addition, will rise, due to the heat of the reaction, to a temperature of about 40° C. Upon completion of the addition of the ether mixture, a Dean-Stark water trap is added to the apparatus following which the apparatus and contents thereof are heated to the reflux temperature of toluene. The flask is maintained at this temperature for a period of about 8 hours, during which time all of the water of addition which is formed during the reaction is collected in the water trap. At the end of this time, the reaction mixture is filtered while hot, the precipitate is recovered as well as the mother liquor. Upon cooling, the precipitate which is formed in the mother liquor is recovered, combined with the precipitate which has been separated from the aforesaid mother liquor and recrystallized from dimethyl formamide using water as the recrystallization agent. The desired product comprising p,p'-bis(1,4,5,6,7,7-hexachlorobicyclo - [2.2.1] - 5 - heptene-2,3-dicarboximido)diphenyl ether is recovered.

EXAMPLE V

A solution of 437 grams (1.0 mole) of 5,6,7,8,9,9-hexachloro - 1,2,3,4,4a,5,8,8a - octahydro-1,4,5,8-dimethano-2,3-naphthalenedicarboxylic anhydride dissolved in 1200 cc. of toluene is placed in a condensation flask. The reactant comprising 107 grams (0.5 mole) of p,p-diaminodiphenyl sulfide which is dissolved in 200 cc. of toluene is slowly added to the mixture during a period of about 0.5 hour. Due to the exothermic matter of the reaction, the temperature will rise in the condensation flask to approximately 40° C. during the addition of the sulfide. Upon completion of the addition, the temperature of the flask is raised to reflux and maintained thereat until all of the water of addition which is formed has been collected in a Dean-Stark water trap which is attached to the flask. When the reaction is completed, as evidenced by no more water being formed, heating is discontinued. The crystalline material which has formed during the reaction is separated by filtration from the mother liquor while still hot. Upon cooling, the solvent is evaporated from the mother liquor and the precipitate which forms thereupon is recovered. This precipitate is combined with the precipitate from the first filtration and dissolved in dimethyl sulfoxide. Recrystallization from the dimethyl sulfoxide utilizing water as the recrystallization agent will permit the recovery of the desired product which comprises p,p' - bis(5,6,7,8,9,9 - hexachloro - 1,2,3,4,4a,5,8,8a-octahydro - 1,4,5,8 - methano - 2,3 - naphthalenedicarboximido(-diphenyl sulfide.

EXAMPLE VI

In this example a mixture of 346 grams (0.5 mole) of 5,6,7,8,9 - hexabromo - 1,2,3,4,4a,5,8,8a - octahydro- 1,4,5,8-dimethano - 2,3 - naphthalenedicarboxylic anhydride which is combined with 1000 cc. of toluene is placed in a condensation flask similar in nature to that hereinbefore described. A mixture of 18.5 grams (0.25 mole) of propylenediamine in 100 cc. of toluene is added dropwise during a period of about 0.5 hour, the temperature of the reaction rising to about 40° C. during the addition. Upon completion of the addition of the diamine compound, the temperature of the flask and contents thereof is raised to reflux (about 112° C.) and maintained thereat until the formation of the water addition ceases. The white crystalline material which is formed during this time, is separated from the mother liquor by means of filtration. The mother liquor is then treated in a manner similar to that hereinbefore set forth and the precipitates are combined. Recrystallization of the material from dimethyl formamide using water as the recrystallization agent will permit recovery of the desired product comprising 1,3-bis-(5,6,7,8,9,9 - hexabromo - 1,2,3,4,4a,5,8,8a - octahydro-5,8-methano-2,3-naphthalenedicarboximido)propane.

EXAMPLE VII

A mixture of 389 grams (1.0 mole) of 1,4,5,6,7,7-hexachlorobicyclo-[2.2.1] - 5 - heptene - 2,3 - dicarboxylic acid combined with 1000 cc. of toluene is placed in a condensation flask and combined with 56 grams (0.5 mole) of 1,4-diaminocyclohexane which has been dissolved in 200 cc. of toluene and slowly added to the flask in a dropwise manner during a period of about 0.5 hour. Upon completion of the addition, the flask is heated to reflux temperature and maintained thereat until the formation of the water of addition ceases. The white crystalline precipitate is separated from the mother liquor by filtration while still hot and the mother liquor is treated in a manner similar to that set forth in the above examples. The precipitates are combined, dissolved in dimethyl sulfoxide and recrystallized by the addition of water. The desired product comprising 1,4-bis(1,4,5,6,7,7-hexachloro-bicyclo - [2.2.1] - 5 - heptene-2,3-dicarboximido)cyclohexane is recovered.

EXAMPLE VIII

A liquid epoxy resin having an epoxide equivalent weight of 190 and known in the trade as "Epon 828" is admixed with 1,2-bis(5,6,7,8,9,9-hexachloro-1,2,3,4,4a,5,8,8a-octahydro - 5,8 - methano - 2,3 - naphthalenedicarboximido)ethane and a curing agent comprising phthalic anhydride. The mixture is heated until said mixture becomes homogeneous and is poured into molds which are prepared from glass sheets using Teflon spacers. In addition, a mold release agent is also used to facilitate the removal of the resin from the molds. The molds are placed in an air-circulating oven and allowed to cure for a period of about 6 hours at a temperature of about 110° C. By utilizing various widths of spacers, sheets of varying thickness are prepared. The sheets are then cut into strips which are evaluated for flame retardancy. In addition to possessing excellent heat distortion temperatures and hardness, as measured by a Shore durometer, the cured resin will be found to be self-extinguishing when removed from the direct action of a flame.

EXAMPLE IX

In like manner, a mixture comprising 150 grams of a polymer comprising polyphenylene oxide which have been modified by the addition of styrene and 150 grams of 1,4-bis(5,6,7,8,9,9-hexachloro - 1,2,3,4,4a,5,8,8a-octahydro - 5,8 - methano - 2,3 - naphthalenedicarboximido)benzene are admixed at an elevated temperature in order to insure that the mixture is homogeneous. After the mixture is poured into molds and cooled, the resulting composition of matter, upon testing, will be found to be self-extinguishing when removed from the direct action of a flame, thus illustrating the flame retardancy properties of the treated polyphenylene oxide.

Likewise, polycarbonates, when treated with the novel compositions of matter comprising the bis-imides of the present invention, will also exhibit greater flame retardant properties, the treated polymers being self-extinguishing when removed from the direct action of a flame.

In addition, the aforesaid compounds such as the epoxy resins, polyphenylene oxides, polycarbonates, etc. which have been treated by the addition of the bis-imides hereinbefore described in greater detail will also exhibit greater stability when exposed to the direct action of sunlight for an extended period of time.

I claim as my invention:

1. A composition of matter possessing the formula:

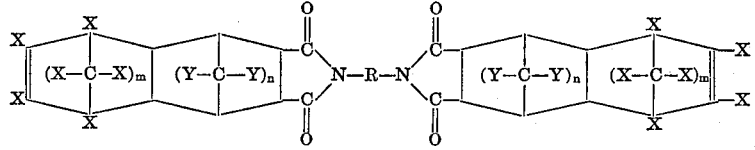

in which X and Y are selected from the group consisting of hydrogen and halogen radicals, at least two X's being halogen; R is selected from the group consiting of $C_2$-$C_4$ alkylene, phenylene, cyclohexylene, $$-(CH_2)_2NH(CH_2)_2NH(CH_2)_2-$$

and

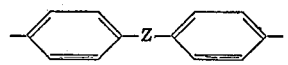

wherein Z is oxygen, sulfur or amino; $m$ is 1 or 2; and $n$ is 1 or 2.

2. A composition of matter as set forth in claim 1 in which X is chlorine.

3. A composition of matter as set forth in claim 1 in which X is bromine.

References Cited

UNITED STATES PATENTS 3,406,148  10/1968  Sambeth et al. _____ 260—47
3,440,248  4/1969   Roberts et al. _____ 260—326

JOSEPH A. NARCAVAGE, Primary Examiner

U.S. Cl. X.R.

106—15; 252—8.1; 260—45.8; 424—274